I. C. Richmond
Snap-Hook.
N° 74426.  Patented Feb. 11, 1868.
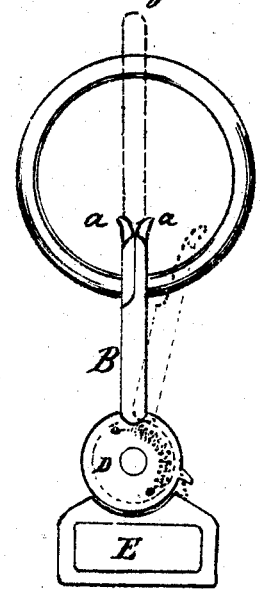
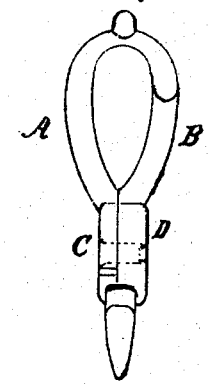
Witnesses.
John H. Shumway
A. J. Tibbits
Inventor
Isaac C. Richmond
By his Attorney
Wm E Earle

United States Patent Office.

ISAAC C. RICHMOND, OF WEST MERIDEN, CONNECTICUT, ASSIGNOR TO H. C. HULL, OF SAME PLACE.

Letters Patent No. 74,426, dated February 11, 1868.

IMPROVED SNAP-HOOK.

*The Schedule referred to in these Letters Patent and making part of the same.*

TO ALL WHOM IT MAY CONCERN:

Be it known that I, ISAAC C. RICHMOND, of West Meriden, in the county of New Haven, and State of Connecticut, have invented a new Improvement in Snap-Hooks; and I do hereby declare the following, when taken in connection with the accompanying drawings, and the letters of reference marked thereon, to be a full, clear, and exact description of the same, and which said drawings constitute part of this specification, and represent, in—

Figure 1, an edge view, and in

Figure 2 a side view.

This invention relates to improvement in that class of hooks commonly called snap or rein-hooks, and consists in the arrangement of the two parts which form the hook, so that the end of the one overlaps the end of the other, the two being halved together so as to give a symmetrical appearance, and the two parts pivoted together so as to open sideways from each other.

To enable others to construct and use my improvement, I will proceed to describe the same as illustrated in the accompanying drawings.

A is the one part, B the other part, the one part projecting from a circular plate, C, and the other from a similar circular plate, D; the one, D, being hollow, so as to receive within a spring, denoted in fig. 1, and the ends of each of the parts formed so as to halve together, as denoted in figs. 1 and 2, the said spring tending to hold the two parts in a closed position. At the front of the two hooks I fix projections, $a$, turning outward, so that, pressed against a ring or other contrivance, as denoted in red, fig. 1, the parts will open, as also denoted in red, fig. 1, and permit the hook to pass over the said ring or contrivance, and when so passed over the spring within the head will close the two parts of the hook and secure the hook to the ring. To one of the plates C or D, I fix an eye, E, in the usual manner for common snap-hooks.

To open the hook, turn with the finger one part from the other, as denoted in red, fig. 1.

The advantages of this hook chiefly rest in its convenience for use, which are apparent without further description.

Having described my invention, what I claim as new and useful, and desire to secure by Letters Patent, is—

The combination of the two parts A and B, pivoted and joined together in the manner described, and so as to open by turning one part from the other to the right or left, as the case may be, as set forth and specified.

ISAAC C. RICHMOND.

Witnesses:
 JAMES B. LEWIS,
 RATCLIFFE HICKS.